Patented Dec. 16, 1947

2,432,698

UNITED STATES PATENT OFFICE 2,432,698

ANTIOXIDANT STABILIZED MATERIAL

Abraham Taub, New York, and Rose Mary Simone, Long Island City, N. Y.

No Drawing. Application February 15, 1945, Serial No. 578,126

16 Claims. (Cl. 167—81)

The present invention relates broadly to the stabilization of fatty oils, fats and waxes of vegetable, animal and marine origin and of essential oils (volatile oils) by preventing or deterring oxidation. It relates more particularly to the retardation of the loss of potency of oil-soluble vitamins, such as vitamins A and D, especially when dispersed in a solid carrier.

It is known that fatty oils, fats, waxes and derivatives made therefrom such as soaps and resins, and compositions containing these type of substances tend to be detrimentally affected by exposure to molecular oxygen, especially over prolonged periods and under certain physical conditions. When oleaginous substances are subject to elevated temperatures, or exposed to actinic rays or brought in contact with certain metals or moisture, the changes are more rapid and the deterioration more serious.

The tendency of oils and fats toward instability moreover, tends to be accentuated by many of the conventional refining processes, because they remove the natural antioxidants contained in the crude oils.

It is likewise known that concentrates of fat soluble vitamins and the parent fish—or fish liver oils are highly affected not only by oxidative deterioration marked by development of rancidity but also by loss of their vitamin A and D content.

It is also known that coffee, its extracts and its oil and other essential oil-containing products deteriorate due to oxidation of the essential oils therein.

It has been proposed to add small amounts of various types of substances to retard oxidation of oils, fats and waxes or substances containing the long chain carboxylic nuclei thereof. It has been proposed to add small amounts of substances to prevent coffee from becoming stale. It has likewise been proposed to stabilize vitamin compositions containing vitamins A and D against loss of potency by the admixture of inhibitors of oxidation therewith. Phenols, hydroquinone, gum guaiac, various aliphatic and aromatic amines, maleic acid, phosphatides, tocopherols, certain natural antioxidants (exact composition only partly known) are among the more common antioxidants.

Within recent years it has been found by certain investigators that small amounts of two or more specific materials when used together exert a synergistic antioxidant action towards oils and fats and oleaginous food products. This means that the effect by the two materials is greater than the average of the same effects of the several materials when used separately. The prior art reveals combinations of wheat germ with tartaric acid, phosphatides and tocopherols with hydroquinone. Cereals as such, cereals processed in various manners and also extracts of cereals have been added to oleaginous materials to render them stable. But an examination of these various methods reveals that the effectiveness in each case is not of a very high order. A test of a commercial product, which is a form of vitamin A concentrate dispersed in cereal flour carrier, extending for six months at room temperatures revealed that 40% of its vitamin A potency had been lost during that interim.

It is well known to those skilled in the art that there exists a need for a more effective antioxidant base, partly because food and/or pharmaceutical preparations reach the consumer with a markedly depreciated vitamin A and D content.

It is an object of this invention to prepare stable vitamin A and D containing materials (the term vitamin A containing material including also its precursors, the carotenes) by the addition of a new co-inhibitor antioxidant combination which displays a synergistic action.

It is likewise an object of our invention to stabilize oils, fats, and waxes of vegetable, animal or marine origin, or compositions containing the same or derived therefrom by the employment of a co-inhibitor antioxidant which exerts a synergistic effect.

It is also an object of our invention to stabilize essential oils (volatile oils) and materials containing the same such as coffee, spices, and natural fruit flavors by the incorporation of small amounts of a co-inhibitor antioxidant which exerts a synergistic effect.

Other objects and advantages of the present invention will become apparent from the following description.

One material of this co-acting combination is niacin or its derivatives, such as its amide, niacinamide, nicotinic acid N-methyl amide, nicotinic acid N-diethyl amide or esters of nicotinic acid such as ethyl nicotinate or the higher fatty alcohol esters such as the lauryl ester, or alkali salts of nicotinic acid. Niacin is the non-technical synonym for nicotinic acid, whose structural formula is represented by

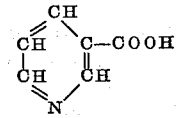

The other essential member of the combination comprises a vegetative material containing natural antioxidants. The preferred group of such material is represented by seeds, particularly oil seeds, cereals, nuts, the fodder- and forage-legumes, and the grasses. But other vegetative materials such as lettuces, spinach, carrots, green tea and tomatoes may be used. Physical portions of these vegetative materials may be employed such as brans and germs of cereal grains, nuts and seeds. Extracts, concentrates, and fractions of these materials may likewise be employed as explained more in detail below.

Occasionally cereal grains and other vegetative substances contain not only natural antioxidants, but small amounts of oxidizing enzymes or factors. In such cases, before utilizing these cereals, seeds, etc. the oxidizing components may be inactivated by simple heat treatment above 50° C. and up to 60° C. without affecting the natural antioxidant properties.

The natural vegetative antioxidant materials include tocopherols, phospholipids, and a class of substances, named by authorities, inhibitols, whose exact structure is not yet known.

Inhibitols (a term first employed by Olcott and Mattill, in J. Amer. Chem. Soc., 58:1627, year 1936, and to be found also on page 160 of a text "Rancidity in Edible Fats," by C. H. Lea, Chemical Publishing Co., 1939) are highly antioxidant compounds found in many plant tissues and in the unsaponifiable fractions of vegetable oils. They can be prepared in the manner described by the two scientists who first used that term by solvent extraction, fractionation, and distillation at .002 to 0.2 mm. They distill over within a range of 90–220° C. as described in that article in the J. Amer. Chem. Soc. 58:1627. They are preferentially soluble in petroleum ether. They are transparent non-crystallizable oils. They contain at least one double bond and one phenolic group. They are inactivated by acetylation but their activity is restored upon subsequent hydrolysis.

Some of the oil bearing seeds, nuts, grains and similar oil-bearing solids, meals, or effective parts thereof are: sesame seed, soy beans, peanuts, cocoa bean, cocoanut meal, cottonseed, linseed, corn, oats, rye, wheat, barley, rice, hominy, wheat germ, corn germ and rice germ, (fatty or defatted), palm kernels, olives, tea seeds, hemp seed, Perilla seed, alfalfa seed, celery seed, rape seed, poppy seed, sunflower seed, pumpkin seed, melon seeds, tomato seeds, grape seeds, peach kernels, and the like.

The flour from cereal grains and seeds in various degrees of refinement can be used.

Among the fodder- and forage-legumes and grasses are included the Leguminosa and particularly alfalfa, clover, alsika clover, China bean, vetch, red clover and the leaves and stems of soy bean, peanut and pea. The dried hay of the legume grasses as well as green fodder legumes are also included. In the use of alfalfa as a fodder legume there is included alfalfa meal, alfalfa leaf meal and alfalfa stem.

The co-inhibitor combinations of the present invention are capable of maintaining a high order of vitamin A potency for periods estimated at a year or more at room temperatures (approximately 25° C.).

It can be appreciated that with such a diversified group of activating materials and whose natural antioxidants moreover are present in such different proportions, the same amounts of one material will not prove to be the equal of the same amount of another material. Moreover the same weight of dry extract of these various vegetative materials will most frequently display a greater effect than an equal weight of the same unextracted crushed vegetative material. To illustrate, 0.02% of an extract of some seed may be satisfactory whereas it will take 0.3% of an extract of a fodder employing the same chemical solvent, and the 0.02% seed extract may be as satisfactory as 1% of the same raw seed.

Vitamin C or ascorbic acid, and analogues or compounds thereof may be added to the two essential components of the co-inhibitor combination above described, for enhanced action.

Niacin or its amide are not in themselves antioxidants for fatty oils or the vitamin containing fatty oils. The natural vegetative antioxidants alone offer protective value of a relatively low order. The combination of niacin or the amide thereof in association with the naturally occurring vegetative antioxidants produces a marked effectiveness. This effect is significantly synergistic i. e., it is far greater than the averaging effects of the individual parts of this co-inhibitor combination. The nicotinic acid nucleus compound should be employed in the proportion of a minimum of 0.2%. The amounts of substances containing natural vegetative antioxidants i. e. seeds, cereals, nuts, legumes or grasses employed are not particularly critical for the attainment of some retardation of oxidation. There is probably no minimum of any substantial amount which will not yield some result. The amount will have to be increased to achieve substantially complete stabilization for temperatures in excess of normal and over a period of weeks. However, the use of more than is necessary would not be economical.

The synergistic effect is amply proven by the following tests carried out at 45° C. for 1500 hours, wherein vitamin A was dispersed in a solid carrier and the test substances or agents added:

Table I

| Item | Substance | Additive | Vitamin A Retained |
|------|-----------|----------|--------------------|
|      |           |          | Per cent |
| 1 | Dextrose 0.98 gm. and Vitamin A concentrate, 2500 I. U. | Niacin 0.02 gm. | 0 |
| 2 | ......do...... | Ascorbic acid 0.02 gm. | 0 |
| 3 | Dextrose 0.97 gm. and Vitamin A concentrate, 2500 I. U. | Niacin 0.02 gm. and tocopherols 0.01 gm. | 40 |
| 4 | Dextrose 0.739 gm. and Vitamin A concentrate, 2500 I. U. | Soy bean flour 0.25 gm., tocopherols 0.01 gm., phosphatides 0.001 gm. | 37 |
| 5 | Dextrose 0.73 gm. and Vitamin A concentrate, 2500 I. U. | Soy bean flour 0.25 gm. and niacin 0.02 gm. | 92 |
| 6 | Dextrose 0.719 gm. and Vitamin A concentrate, 2500 I. U. | Soy bean flour 0.25 gm., niacin 0.02 gm. and tocopherols 0.01 gm. and phosphatides 0.001 gm. | 95 |
| 7 | Dextrose 0.73 gm. and Vitamin A concentrate, 2500 I. U. | Soy bean flour 0.25 gm., niacin amide 0.02 gm. | 77 |
| 8 | Dextrose 0.719 gm. and Vitamin A concentrate, 2500 I. U. | Soy bean flour 0.25 gm., niacinamide 0.02 gm. and tocopherols 0.01 gm., phosphatides 0.001 gm. | 85 |
| 9 | Dextrose 0.75 gm. and Vitamin A concentrate, 2500 I. U. | Soy bean flour 0.25 gm. | 35 |
| 10 | Dextrose 0.95 gm. and Vitamin A concentrate, 2500 I. U. | Niacin 0.02 gm. ascorbic acid 0.02 gm. tocopherols 0.01 gm. | 65 |
| 11 | Vitamin A concentrate, 2500 I. U. | Niacin 0.02 gm., ascorbic acid 0.02 gm., tocopherols 0.01 gm., soy bean flour 0.95 gm. | 97 |
| 12 | Dextrose 0.98 gm. and Vitamin A concentrate, 2500 I. U. | Corn oil 0.02 gm. (unsaponified fraction). | 40 |
| 13 | Dextrose 0.96 gm. and Vitamin A concentrate, 2500 I. U. | Corn oil 0.02 gm. (unsaponified fraction), niacin 0.02 gm. | 82 |
| 14 | Vitamin A concentrate, 2500 I. U. | Oatmeal 0.96 gm. niacin 0.02 gm., corn oil 0.02 gm. (unsaponified fraction). | 90 |

Vitamin A contents before and after storage at 45° C. were determined by spectrophotometric techniques, using biologically assayed vitamin A concentrate as reference standard. The niacin, or niacinamide concentration used was 1%.

It will be seen from the foregoing table that it would be expected that the effect of the addition of soy bean flour, niacin, tocopherols and phosphatides would be 38.5% (average of items 3 and 4), where as it is 95% (item 6). The tocopherols plus phosphatides had some additional effect; their presence increased the vitamin retention from a figure of 92% to 95%. It will also be seen that niacin is a better complement to the naturally occurring anti-oxidants than niacinamide, because soy bean flour plus niacinamide added to vitamin A effects a retention of 77% (item 7) whereas the addition of soy bean flour plus niacin secures 92% (item 5).

Cereal grain flours and other dry food stuff may contain very small amounts of niacin, viz., of the order of 0.01 to 0.1 mg. niacin per gram of the vegetative material. Soy bean flour, for example, contains 0.04 mg. niacin per gram. Amounts of this low order, representing fractions of a milligram are entirely inadequate for stabilization of oleaginous vitamins or fatty oils or fats. From the above table it will be seen that soy bean flour alone is inadequate, because even when aided by the addition of phospholipids and tocopherols, the percentage of vitamin A retained was only 37%. Only when niacin is added in a concentration many times the above natural concentration does its antioxidant co-inhibitor action become effectively manifested, viz. 2 to 20 mg. of niacin or its derivative per gram of vitamin A bearing product, or fatty oil or fat or essential oil bearing product. Larger amounts may even be used to advantage in higher potencies of vitamin A.

For oils or fats where some of the members of the co-inhibitor class are not soluble in the oil directly in sufficient quantity for the optimum protection, a mutual solvent may be employed. This can be illustrated in the case of niacinamide which is of limited solubility in fatty oils. By first dissolving 2 gm. of it in 40 cc. of alcohol (95%) and then adding 60 cc. of lauryl alcohol, this solution will then be miscible with 1 liter of vegetable or animal oils. Other proportions and other solvents may be used. However we prefer to use oil soluble derivatives or components of the antioxidant co-inhibitor in the protection of oils and fats.

Concerning the utilization of seeds, cereal grains, nuts, the fodder and forage legumes and the grasses to secure the optimum effects of the natural antioxidant or antioxidants therein, such materials usually are crushed and added in the crushed form to oil or fat. Or such vegetative materials may be extracted by the selected oil or fat as at 150° F. for an hour or so. It is not necessary however that the crushed materials remain in the oleaginous substance.

Solvents may be used, singly or in combination, to extract these vegetative materials, including water, acidulated water, alcohols, hydrocarbons, esters of the lower carboxylic acids, ketones of not more than 6 carbon atoms, alcohols of 1-6 carbon atoms, volatile aliphatic hydrocarbons and volatile halogenated hydrocarbons. The solvent is usually distilled out and the residue employed directly.

Non-volatile solvents such as glycols may also be used, where the presence of such solvent in the final product may be desired.

The following specific solvents may be used: ethyl alcohol, n-propyl alcohol, isopropyl alcohol, n-butyl alcohol, allyl alcohol, methyl formate, ethyl formate, methyl acetate, ethyl acetate, glycol formate, glycol diformate, methyl levulinate, methyl aceto acetate, ethyl aceto acetate, vinyl acetate, acetone, methyl ethyl ketone, carbon tetrachloride, ethylene trichloride, hexane, gasoline and benzene, water, acidulated water such as diluted acetic acid, and proplene glycol.

Concentrated fractions of the vegetative material containing natural antioxidants can be employed as has been mentioned. This embraces fractions such as are obtained by solvent extraction, or by vacuum distillation, or which occur in the non-saponifiable fraction of the extract, provided all such fractions possess a higher antioxidative action than the material being stabilized. A non-saponifiable fraction or a crude phosphatide fraction of a fatty oil may be employed as such or vacuum distilled or fractionated from solvents by freezing, or otherwise fractionated.

The antioxidant co-inhibitor combination of our invention may be used to prevent or substantially inhibit oxidation and decrease of vitamin potency of any fat-soluble vitamin-containing material. One of the principal uses is in the protection of fish liver oils, such as cod liver oil, halibut liver oil, sword fish liver oil, tuna fish liver oil, porpoise liver oil, and shark liver oil against loss of vitamins, and the development of rancidity. The fat-soluble vitamin concentrates obtained by the saponification of these or other vitamin-containing oils and extraction of the unsaponifiable material may be likewise treated to prevent destruction of vitamins A and D, particularly when they are dispersed on solid carriers when the area of contact with atmospheric oxygen is considerably increased.

The incorporation of applicants' co-inhibitor of oxidation combinations may be employed in the stabilization of such oleaginous food products as shortening, lard, oleo oil, dried milk and other dairy products including butter, and salad dressing against oxidation. It finds utility also in preventing or controlling oxidation of such industrial compositions as soaps, textile finishing and softening agents containing unsulfonated or sulfonated oils, cosmetics and perfume oils, lubricants, paints, varnish, dopes for artificial leather or other coating compositions, compositions for fat-liquoring leather and other compositions containing a fatty nucleus.

The following examples are illustrative of certain of our preferred co-inhibitor combinations.

*Example 1*

| | Gram |
|---|---|
| Vitamin A concentrate (500,000 I. U. per gm.) equivalent to 50,000 I. U. vitamin A | 0.1 |
| Soy bean flour (not defatted) | 0.7 |
| Niacinamide | 0.1 |
| Mixed tocopherols | 0.1 |
| Cottonseed phosphatides, containing essentially lecithins and cephalins | 0.01 |

These components are thoroughly mixed in dry form, or if desired with the aid of a small amount of solvent, such as alcohol (95%), which is allowed to evaporate spontaneously.

*Example 2*

| | Gram |
|---|---|
| Vitamin A concentrate (100,000 I. U. per gm.) equivalent to 1,000 I. U. vitamin A | 0.01 |
| Soy bean flour (22% oil content), debittered | 0.25 |
| Tocopherol | 0.003 |
| Niacin | 0.002 |
| Dextrose | 0.77 |

These components are mixed dry.

Example 3

| | Gram |
|---|---|
| Vitamin A concentrate (500,000 I. U. per gm.) equivalent to 100,000 I. U. vitamin A in ester form | 0.2 |
| Soy bean flour (not defatted) | 0.9 |
| Niacinamide | 0.05 |
| Mixed tocopherols | 0.1 |
| Cottonseed phosphatides | 0.01 |
| Vitamin C | 0.1 |

Example 4

| | Gram |
|---|---|
| Vitamin A concentrate (500,000 I. U. per gm.) equivalent to 5000 I. U. vitamin A esters | 0.01 |
| Unsaponifiable extract from corn oil | 0.01 |
| Niacin | 0.02 |
| Dextrose | 0.95 |
| Vitamin C | 0.01 |

Example 5

| | Gram |
|---|---|
| Vitamin A concentrate (500,000 I. U. per gm.) equivalent to 5000 I. U. vitamin A esters | 0.01 |
| Niacin | 0.02 |
| Dextrose | 0.93 |
| Vitamin C | 0.02 |
| Alpha tocopherol | 0.01 |
| Vegetable phosphatides (especially lecithins and cephalins) | 0.01 |

The above examples are given by way of illustration and not by way of limitation.

It will be obvious that the process and compositions described herein may be varied in their detail without departing from the spirit and scope of the present invention, which is not limited to the specific details, except as defined by the appended claims. It will be understood that whenever any of the terms, "vegetative antioxidant," "seeds," "cereal grains," "nuts," the fodder and forage legumes" and "the grasses" appear in the claims that it embraces not only the original material but also physical portions thereof, or fractions or concentrated fractions of said materials or its portions, provided such vegetative additive is not the same as the oxidizable oil-containing material being treated and furthermore that it possesses in its own right anti-oxygenic action superior to it.

It will be also understood that the term "oils" in the claims embraces not only the fatty oils, fats and ester type waxes but also the essential oils, unless otherwise qualified, but it does not include other oils. In the claims the words "oil seed" will includes "nuts" unless otherwise distinguished.

What we claim is:

1. A material having improved vitamin stability, containing a member of the group consisting of vitamins A and D and including an antioxidant which is a co-inhibitor combination comprising both a nicotinic acid nucleus compound in the proportion of a minimum of 0.2% and a natural vegative autioxidant.

2. A material having improved vitamin stability, containing a member of the group consisting of vitamins A and D and including an ascorbic acid nucleus compound, and an antioxidant co-inhibitor combination comprising both a nicotinic acid nucleus compound in the proportion of a minimum of 0.2% and a natural vegetative antioxidant.

3. A material having improved vitamin stability, containing a member of the group consisting of vitamins A and D and including an antioxidant which is a co-inhibitor combination comprising both a nicotinic acid nucleus compound in the proportion of a minimum of 0.2% and subdivided oil seed.

4. A material having improved vitamin stability, containing a member of the group consisting of vitamins A and D and including an antioxidant, which is a co-inhibitor combination comprising both a nicotinic acid nucleus compound in the proportion of a minimum of 0.2% and subdivided soy bean.

5. An oxidizable vitamin-containing fish liver oil having incorporated therein an antioxidant which is a co-inhibitor combination comprising both a nicotinic acid nucleus compound in the proportion of a minimum of 0.2% and subdivided oil seed.

6. An oxidizable vitamin-containing fish liver oil having incorporated therein an anti-oxidant which is a co-inhibitor combination comprising both a nicotinic acid nucleus compound in the proportion of a minimum of 0.2% and subdivided soy bean.

7. A material having improved vitamin stability, containing a member of the group consisting of vitamins A and D and including an ascorbic acid nucleus compound and an antioxidant co-inhibitor combination comprising both a nicotinic acid nucleus compound in the proportion of a minimum of 0.2% and subdivided oil seed.

8. A material having improved vitamin stability containing a member of the group consisting of vitamins A and D, and including an ascorbic acid nucleus compound, and an antioxidant co-inhibitor combination comprising both a nicotinic acid nucleus compound in the proportion of a minimum of 0.2% and subdivided soy bean.

9. A material having improved vitamin stability, containing a member of the group consisting of vitamins A and D and including an antioxidant which is a co-inhibitor combination comprising both a nicotinic acid nucleus compound in the proportion of a minimum of 0.2% and a subdivided cereal grain.

10. An oxidizable vitamin-containing fish liver oil having incorporated therein an anti-oxidant which is a co-inhibitor combination comprising both a nicotinic acid nucleus compound in the proportion of a minimum of 0.2% and a subdivided cereal grain.

11. A material having improved vitamin stability, containing a member of the group consisting of vitamins A and D and including an antioxidant which is a co-inhibitor combination comprising both a nicotinic acid nucleus compound in the proportion of a minimum of 0.2% and the unsaponifiable fraction of vegetable oil.

12. A material having improved vitamin stability, containing a member of the group consisting of vitamins A and D and including an antioxidant, which is a co-inhibitor combination comprising both a nicotinic acid nucleus compound in the proportion of a minimum of 0.2% and a tocopherol.

13. A material having improved vitamin stability, containing a member of the group consisting of vitamins A and D and including an antioxidant, which is a co-inhibitor combination comprising both a nicotinic acid nucleus compound in the proportion of a minimum of 0.2%, a tocopherol and a phosphatide.

14. An oxidizable vitamin-containing fish liver oil having incorporated therein an anti-oxidant which is a co-inhibitor combination comprising both a nicotinic acid nucleus compound in the proportion of a minimum of 0.2% and an unsaponifiable fraction of vegetable oil.

15. A material having improved vitamin stability, containing a member of the group consisting of vitamins A and D, and including an ascorbis acid nucleus compound, and an anti-oxidant co-inhibitor combination comprising both a nicotinic acid nucleus compound in the proportion of a minimum of 0.2% and the unsaponifiable fraction of a vegetable oil.

16. A material having improved vitamin stability, containing a member of the group consisting of vitamins A and D, and including an ascorbic acid nucleus compound, and an anti-oxidant co-inhibitor combination comprising both a nicotinic acid nucleus compound in the proportion of a minimum of 0.2% and a tocopherol.

ABRAHAM TAUB.
ROSE MARY SIMONE.

REFERENCES CITED

The following references are of record in the file of this patent:

UNITED STATES PATENTS

| Number | Name | Date |
|---|---|---|
| 2,345,577 | Buxton | Apr. 4, 1944 |
| 2,353,011 | Buxton | July 4, 1944 |
| 2,359,413 | Freedman | Oct. 3, 1944 |
| 2,363,778 | Pederson | Nov. 28, 1944 |
| 2,389,955 | Buxton | Nov. 27, 1945 |